(12) United States Patent
Li et al.

(10) Patent No.: US 12,644,616 B2
(45) Date of Patent: Jun. 2, 2026

(54) GAS PURIFICATION ASSEMBLY FOR AIR-CONDITIONING INDOOR UNIT AND AIR-CONDITIONING INDOOR UNIT

(71) Applicant: Carrier Corporation, Palm Beach Gardens, FL (US)

(72) Inventors: Huanan Li, Shanghai (CN); Ran Yang, Shanghai (CN); Peter McKinney, Colorado Springs, CO (US); Hongsheng Liu, Shanghai (CN); Michael Birnkrant, Syracuse, NY (US); Huaxi Li, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 376 days.

(21) Appl. No.: 18/359,961

(22) Filed: Jul. 27, 2023

(65) Prior Publication Data

US 2024/0035692 A1 Feb. 1, 2024

(30) Foreign Application Priority Data

Jul. 27, 2022 (CN) .......................... 202210892651.0

(51) Int. Cl.
| | |
|---|---|
| *B01D 46/00* | (2022.01) |
| *B01D 50/00* | (2022.01) |
| *F24F 6/12* | (2006.01) |
| *F24F 8/10* | (2021.01) |
| *F24F 8/108* | (2021.01) |
| *F24F 8/167* | (2021.01) |
| *F24F 8/30* | (2021.01) |

(52) U.S. Cl.
CPC ............ *F24F 8/30* (2021.01); *B01D 46/0002* (2013.01); *B01D 46/0027* (2013.01); *B01D 50/00* (2013.01); *F24F 6/12* (2013.01); *F24F 8/108* (2021.01); *F24F 8/167* (2021.01)

(58) Field of Classification Search
CPC ...................... B01D 46/0002; B01D 46/0027; B01D 50/00; F24F 8/30; F24F 8/167; F24F 8/108; F24F 6/12
See application file for complete search history.

(56) References Cited

FOREIGN PATENT DOCUMENTS

| | | | | | |
|---|---|---|---|---|---|
| CN | 1883774 | A | * | 12/2006 | |
| CN | 210096465 | U | * | 2/2020 | |
| JP | 2004251497 | A | * | 9/2004 | |
| JP | 5111648 | B1 | * | 1/2013 | .............. F24F 7/003 |

* cited by examiner

*Primary Examiner* — Robert A Hopkins
(74) *Attorney, Agent, or Firm* — Drew Folgmann

(57) ABSTRACT

A gas purification assembly for an air-conditioning indoor unit, the gas purification assembly comprising: a filter device arranged at or near an air inlet end of the air-conditioning indoor unit, for filtering particles entrained in the gas entering through the air inlet end; an ion generator located downstream of the filter device along the gas flow direction, for increasing the content of positive and/or negative ions in the gas flow; an atomizing device located downstream of the ion generator along the gas flow direction, for increasing the humidity and the amount of ions of the gas flow, and eliminating the ozone generated by the ion generator; and a photocatalytic device located downstream of the atomizing device along the gas flow direction, for performing a photocatalytic reaction on the humidified gas flow. An air-conditioning indoor unit equipped with the gas purification assembly is also disclosed.

16 Claims, 1 Drawing Sheet

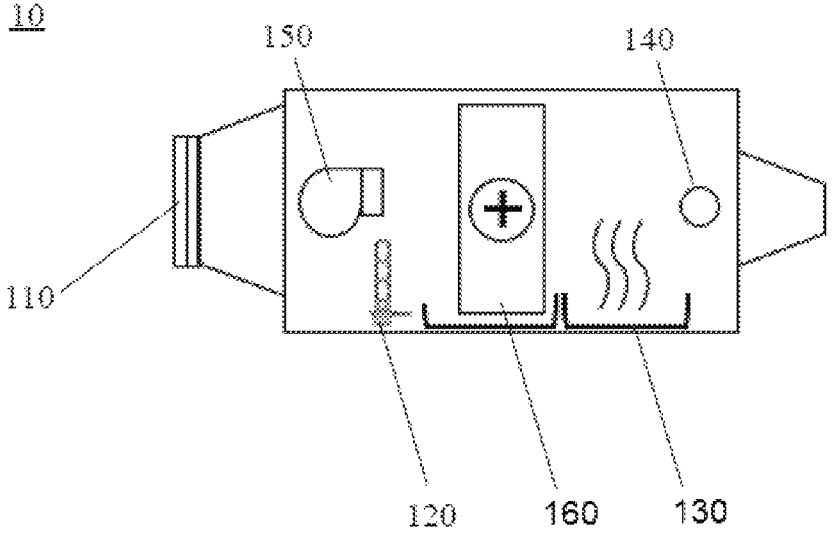

GAS PURIFICATION ASSEMBLY FOR AIR-CONDITIONING INDOOR UNIT AND AIR-CONDITIONING INDOOR UNIT

FIELD OF THE INVENTION

The invention relates to the technical field of air conditioners, in particular to a gas purification assembly for an air-conditioning indoor unit, and also to an air-conditioning indoor unit equipped with the gas purification assembly.

BACKGROUND OF THE INVENTION

With the advancement of science and technology and the development of economy, people's quality of life has been continuously improved, and people have begun to pay more and more attention to their own quality of life. As a product that can improve people's indoor comfort, air conditioners have been installed in more and more buildings in recent decades. Air conditioners have become an indispensable electrical appliance in winter and summer. Air conditioners help people solve the problem of indoor thermal comfort, but in recent years, more and more attention has been paid to indoor air quality.

In recent years, with the continuous deterioration of air quality, the content of pollutants in the air has continued to rise, resulting in poor indoor and outdoor air quality, which has brought great trouble to people's lives. At present, many air conditioners on the market have certain air purification capabilities, for example, larger particles can be filtered and adsorbed by means of filter screens. However, these filter materials are only limited to the elimination of particulate pollutants, that is, adsorption and filtration of particles or molecules of their corresponding diameters. The selectivity to adsorbates is too high to be used alone in complex gas environments. For example, it is difficult for filter screens to eliminate bacteria, viruses and other biological pollutants. Unsterilized gas may carry bacteria, viruses, carcinogen carriers, etc. Once they invade human lungs, it will seriously endanger human health.

In addition, other gas purification devices, commonly referred to as "ion generators", are designed to emit negative ions into the surrounding air. These ions attach to positively charged pollutants such as particles or dust, causing the pollutants to precipitate or become trapped in the collection plate. However, ion generators cannot effectively eliminate chemical pollutants such as volatile organic compounds (VOCs) in the air environment. Furthermore, the ion generators will generate by-products such as ozone while emitting positive and/or negative ions into the surrounding air. The generated ozone enters the room with the gas flow, and its strong oxidizing property may be harmful to human health.

Therefore, there is an urgent need to provide a gas purification assembly for an air-conditioning indoor unit capable of high-efficiency air purification.

SUMMARY OF THE INVENTION

In view of the above, a gas purification assembly for an air-conditioning indoor unit is provided. The gas purification assembly comprises:

a filter device arranged at or near an air inlet end of the air-conditioning indoor unit, for filtering particles entrained in the gas entering through the air inlet end;

an ion generator located downstream of the filter device along the gas flow direction, for increasing the content of positive and/or negative ions in the gas flow;

an atomizing device located downstream of the ion generator along the gas flow direction, for increasing the humidity and the amount of ions of the gas flow, and eliminating ozone produced by the ion generator; and a photocatalytic device located downstream of the atomizing device along the gas flow direction, for performing a photocatalytic reaction on the humidified gas flow.

In embodiments of the gas purification assembly, the atomizing device has a container for accommodating a liquid to be atomized, wherein the liquid is condensing water of the air-conditioning indoor unit.

In embodiments of the gas purification assembly, the photocatalytic device is an ultraviolet photocatalytic device comprising a titanium dioxide photocatalyst and an ultraviolet lamp.

In embodiments of the gas purification assembly, the ion generator comprises at least one or more of: a negative ion generator, a positive ion generator, a positive and negative ion generator, a bipolar ion generator, and a plasma generator.

In embodiments of the gas purification assembly, the ion generator comprises one or more pairs of bipolar ion generators, wherein the one or more pairs of bipolar ion generators comprise pairs of positive ion generators and negative ion generators.

In embodiments of the gas purification assembly, the air-conditioning indoor unit further comprises a fan, wherein the fan is arranged near the ion generator.

In embodiments of the gas purification assembly, the atomizing device is an ultrasonic atomizing device.

In embodiments of the gas purification assembly, the air-conditioning indoor unit further comprises a cooling/heating unit, wherein the cooling/heating unit is provided with a condensing water collection tray that remains in fluid communication with the container of the atomizing device.

In embodiments of the gas purification assembly, the cooling/heating unit is arranged between the atomizing device and the ion generator.

In addition, an air-conditioning indoor unit equipped with the aforementioned gas purification assembly is further provided.

It can be appreciated that the gas purification assembly for an air-conditioning indoor unit according to the invention advantageously combines a filter device, an ion generator, an atomizing device and a photocatalytic device, and is capable of achieving high-efficiency air purification: the filter device performs filtration and adsorption for air that participates in the air conditioning cycle to remove particles and dust; the ion generator produces active particles for sterilization and disinfection; the atomizing device eliminates pollutants such as ozone generated by the ion generator while humidifying the gas flow; the photocatalytic device can eliminate chemical pollutants and biological pollutants at the same time to further enhance the effect of sterilization and disinfection, thereby significantly improving the quality of air output by the air-conditioning indoor unit.

BRIEF DESCRIPTION OF THE DRAWINGS

The technical solutions of the present invention will be described in further detail below in conjunction with the accompanying drawings and embodiments, wherein:

FIG. 1 shows a schematic structural diagram of the application of the gas purification assembly for an air-conditioning indoor unit according to the invention in an air-conditioning indoor unit.

DETAILED DESCRIPTION OF THE INVENTION

Embodiments of the invention will be described in detail below with reference to the accompanying drawings. It should be noted that orientation terms such as upper, lower, left, right, front, rear, inner side, outer side, top, bottom, upstream and downstream mentioned or possibly mentioned in this specification are defined relative to the configurations illustrated in the respective drawings. They are relative concepts, so they may change accordingly according to their different locations and different states of use. Therefore, these and other orientation terms shall not be construed as restrictive terms.

The effective treatment of air pollution, especially indoor air pollution, which causes serious harm to human body, has attracted more and more attention. Hundreds of volatile organic compounds (VOCs) have been identified from indoors, mainly including aliphatic hydrocarbons, aromatic hydrocarbons, chlorinated hydrocarbons, aldehydes and ketones. According to the principle of action, the methods for indoor air purification used by air-conditioning indoor units can be divided into: ventilation type, filter type, adsorption type and catalytic purification type, etc., but they all have their own shortcomings. The air conditioner can only regulate the temperature and humidity of the indoor air, but cannot improve the air quality; the ion generator cannot decompose chemically harmful substances; the filter device can only adsorb particles and dust, is limited by the saturated adsorption capacity and thus needs to be replaced frequently, and the filter material needs further treatment after adsorption; the ultraviolet lamp can photodegrade volatile organic compounds, but the efficiency thereof is low and energy consumption is high. The adoption of a single technology for the treatment of various pollutants in indoor air has problems such as incomplete purification, short service life, secondary pollution etc., which is difficult to achieve a satisfactory result.

FIG. 1 schematically illustrates the structure of an embodiment of a gas purification assembly for an air-conditioning indoor unit. As can be clearly seen from FIG. 1, the gas purification assembly is mainly composed of a filter device 110, an ion generator 120, an atomizing device 130, a photocatalytic device 140 and other components. The filter device 110 is arranged at the air inlet end of the air-conditioning indoor unit 100 for filtering and adsorbing smaller particles or dust in the gas entering through the air inlet end. The filter material of the filter device 110 may comprise a porous material, such as nylon meshes, high efficiency particulate air filter meshes (HEPA filter meshes), activated carbon, metal organic frameworks (MOFs) and the like. Among them, nylon meshes, HEPA filter meshes, and MOFs are all filter materials with a single pore size, and the pore sizes of these materials are millimeter-scale, micron-scale, or nanoscale, respectively. In addition, the ion generator 120 uses a high-voltage transformer to boost the voltage to a required voltage to generate positive and negative ions that are released into the surrounding air, so as to achieve the purpose of sterilization and/or disinfection by increasing the content of positive and/or negative ions in the gas flow. The ion generator 120 is fixed on the housing of the air-conditioning indoor unit 100 in a detachable manner, for example, in a plug-in manner. When the air-conditioning indoor unit 100 is running, the ion generator 120 is activated. On the one hand, the ion generator 120 can sterilize the air entering the air-conditioning indoor unit 100, and on the other hand, the filter device 110 can filter and adsorb particulates and dust in the air, thereby effectively purifying the air.

With continued reference to FIG. 1, in the gas purification assembly the atomizing device 130 is arranged downstream of the ion generator 120 along the gas flow direction (as shown by the arrow in FIG. 1), for increasing the humidity of the gas flow or the ambient air. It should be noted that while atomizing water, the atomizing device 130 not only generates water molecules but also decomposed products of water, such as hydrogen ions ($H^+$) and hydroxide radicals ($OH^-$). It is known to those skilled in the art that hydroxide radicals themselves have strong oxidizing properties and will combine with bacteria in the air, breaking through the cell walls and combining with hydrogen ions in the cell membranes, thereby inactivating the bacteria to achieve disinfection effects. It can be seen that after the droplets of micron-scale generated by the atomizing device are discharged into the ambient air, the combination of the atomized droplets of micron-scale and negative oxygen ions can effectively remove viruses, bacteria and other biological pollutants. At the same time, the atomizing device releases negative oxygen ions that are beneficial to physical health into the room, increases air humidity, and eliminates by-products such as ozone generated by the upstream ion generator, thereby achieving the multiple purposes of cooling, dust removal, humidification, and ozone removal for the air.

In the embodiment shown in FIG. 1, the photocatalytic device 140 is located downstream of the atomizing device 130 along the gas flow direction, for performing a photocatalytic reaction on the humidified gas flow, that is, increasing the humidity to improve photocatalytic efficiency, thereby optimizing the performance of the photocatalytic device. Specifically, the photocatalytic device 140 may be an ultraviolet photocatalytic device comprising a titanium dioxide photocatalyst and an ultraviolet lamp. Wherein, the ultraviolet ray emitted by the ultraviolet lamp irradiates the surrounding gas that passes by, killing bacteria in the gas. The titanium dioxide photocatalyst can perform a photocatalytic reaction under the irradiation of ultraviolet light with a wavelength below 388 nm, so as to oxidize the organic volatile gas in the air into harmless substances. At the same time, the titanium dioxide photocatalyst will generate hydroxyl radicals under the irradiation of ultraviolet light, which can kill some germs with nucleus or membrane that are difficult to kill with ultraviolet light alone. Under the strong oxidation of hydroxyl radicals, the nucleic acid of germs is oxidized into $CO_2$ and $H_2O$, so that they cannot be regenerated at all, and the purpose of killing bacteria is completely achieved.

It should be further pointed out that in an environment with a relatively high humidity, the photocatalytic device 140 is more likely to generate hydroxyl radicals and active oxygen with strong oxidizing capabilities, which have strong photo-reduction-oxidation functions that can oxidatively decompose various volatile organic compounds and some inorganic substances, destroy the cell membrane of bacteria and solidify the protein of virus, and decompose organic pollutants into pollution-free water ($H_2O$) and carbon dioxide ($CO_2$), thus having very strong sterilization, deodorization, anti-mildew, anti-fouling and self-cleaning, and air-purifying functions. Upon experimental verification, to achieve the same sterilization and disinfection effect, the energy consumption of the photocatalytic device combined with the atomizing device is much lower than that of the ultraviolet lamp alone, while the former only needs one-fifth of the energy consumption of the latter. It is known to those skilled in the art that, under the working condition of dry air, the catalytic efficiency of the photocatalytic device is greatly reduced. Since the gas flow is humidified through the atomizing device, the catalytic performance of the photocatalytic device will be significantly improved.

Generally speaking, the atomizing device 130 is provided with a container for accommodating the liquid to be atomized, wherein the liquid is condensing water of the air-conditioning indoor unit 100 for recycling. Specifically, the air-conditioning indoor unit 100 further comprises a cooling/heating unit 160. The cooling/heating unit 160 is provided with a condensing water collection tray that maintains in fluid communication with the container of the atomizing device 130, so that the atomizing device 130 can directly atomize condensing water of the air-conditioning indoor unit. As shown in FIG. 1, the cooling/heating unit 160 is arranged between the atomizing device 130 and the ion generator 120, so that the atomizing device 130 and the photocatalytic device 140 are arranged near the air outlet end of the air-conditioning indoor unit 100.

In some embodiments, the indoor unit of the air-conditioning indoor unit 100 comprises a housing having an air inlet end and an air outlet end. The air inlet end is configured to receive ambient air, and the air outlet end is configured to deliver purified air into the interior space. The housing provides a gas flow path from the air inlet end to the air outlet end. The indoor unit of the air-conditioning indoor unit further comprises a fan 150 and a driving mechanism (not shown), wherein the fan 150 may be disposed near the ion generator 120. The gas purification assembly is disposed in the gas flow path for removing pollutants in the ambient gas passing therethrough. The fan 150 is configured to move the air to pass through the gas flow path between the air inlet end and the air outlet end. The driving mechanism (e.g., motor) is configured to power the fan 150 to draw air into the air inlet end, draw air to pass through the gas flow path, and discharge purified air from the air outlet end.

The ion generator may further comprise a negative ion generator. The negative ion generator is a device that generates air negative ions. The negative ionizer 120a is a device that generates negative air ions. The device processes the input DC or AC current by EMI processing circuit and lightning protection circuit, then limits the current by over-voltage of a pulse circuit; makes use of circuits with isolated high and low voltage to rise up to AC high voltage, and then obtains purified DC negative high voltage upon rectification and filtration of special grade electronic materials, connects the DC negative high voltage to the release tip made of metal or carbon element, and uses the DC high voltage at the tip to generate the high corona to release a large number of electrons (e–) at high speed. While electrons cannot exist for a long time in the air (existing electrons only has an nS grade lifetime), they will be immediately captured by oxygen molecules ($O_2$) in the air to form negative ions. The content of negative ions in the air is an important factor to determine the quality of the air. A proper amount of negative ions in the air can effectively remove dust, sterilize and purify the air. It is easily understood by those skilled in the art that the number and specifications of the negative ionizer may be various to meet the purification requirements under different environments. Of course, the ion generators are not limited to the aforementioned negative ion generators, but can also be positive ion generators for outputting positive ions. When negatively charged bacteria are infiltrated by high-concentration and high-energy positive ions, an electrolytic process will occur rapidly, and the cell walls of the bacteria will be severely damaged, and then the bacteria will die or lose their ability to reproduce. Therefore, the positive ion generator can also achieve the goal of air purification. In addition to the aforementioned negative ion generators and positive ion generators, the ion generators may also include positive and negative ion generators, bipolar ion generators, plasma generators, and the like. The case of the bipolar ion generator will be explained in detail below.

In order to improve the sterilization and disinfection effect of the gas purification assembly, the ion generator 120 comprises a pair of bipolar ion generators. Specifically, the pair of bipolar ion generators are provided with pairs of positive ion generators and negative ion generators. The bipolar ion generator utilizes $O_2^+$ and $O_2^-$ generated by corona discharge to purify the air. $O_2^+$ and $O_2^-$ generated by corona discharge or other methods have very high chemical activity and can react with water molecules in the air to form $H_2O_2$. In the process of further chemical reaction, the oxidant decomposes bacterial protein, thereby achieving the effect of disinfection and/or sterilization. Therefore, in a closed environment, the bipolar ion generator can effectively inhibit the growth of microorganisms and bacteria. It is readily appreciated by those skilled in the art that the number and specifications of the bipolar ion generators can be different to so as to meet the purification requirements of different environments. For example, the ion generator may also comprise a plurality of pairs of bipolar ion generators.

As an example, the atomizing device 130 may be an ultrasonic atomizing device. Here, the structure and type of the atomizing device 130 are not specifically limited.

In addition, the invention further provides an air-conditioning indoor unit equipped with the aforementioned gas purification assembly. The air-conditioning indoor unit 100 generally comprises a fan 150, a cooling/heating unit 160 and other components. Therefore, in addition to the conventional function of cooling or heating, the air-conditioning indoor unit equipped with the aforementioned gas purification assembly also has the function of high-efficiency air purification.

To sum up, the gas purification assembly for an air-conditioning indoor unit advantageously integrates the filter device, the ion generator, the atomizing device and the photocatalytic device, and is capable of achieving high-efficiency air purification: the filter device performs filtration and adsorption for air that participates in the air conditioning cycle to remove particulate pollutants; the ion generator generates active particles for sterilization and disinfection, thereby eliminating biological pollutants and some particulate pollutants; the atomizing device can eliminate ozone and other by-products generated by the ion generator while humidifying the gas flow; the photocatalytic device performs a photocatalytic reaction on the gas flow humidified by the atomizing device, which can not only improve the purification efficiency, but also eliminate chemical pollutants and biological pollutants, thereby further enhancing the effect of sterilization and disinfection.

Some specific embodiments are listed above to illustrate in detail the gas purification assembly for an air-conditioning indoor unit and the air-conditioning indoor unit equipped with the gas purification assembly according to the present invention. These individual examples are only used to illustrate the principle of the present invention and the implementations thereof, but not to limit the invention.

Those skilled in the art may, without departing from the spirit and scope of the invention, make various modifications and improvements. Therefore, all equivalent technical solutions shall belong to the scope of the invention and be defined by the respective claims of the present invention.

What is claimed is:

1. A gas purification assembly for an air-conditioning indoor unit, wherein the gas purification assembly comprises:

a filter device arranged at or near an air inlet end of the air-conditioning indoor unit, for filtering particles entrained in gas entering through the air inlet end;

an ion generator located downstream of the filter device along the gas flow direction, for increasing content of positive and/or negative ions in the gas flow;

an atomizing device located downstream of the ion generator along the gas flow direction, for increasing humidity and amount of ions of the gas flow and eliminating ozone generated by the ion generator, wherein the atomizing device comprises a container in fluid communication with a cooling/heating unit configured to receive and accommodate a liquid to be atomized, the liquid being condensing water of the air-conditioning indoor unit; and a photocatalytic device located downstream of the atomizing device along the gas flow direction, for performing a photocatalytic reaction on humidified gas flow.

2. The gas purification assembly according to claim 1, wherein the photocatalytic device is an ultraviolet photocatalytic device comprising a titanium dioxide photocatalyst and an ultraviolet lamp.

3. The gas purification assembly according to claim 1, wherein the ion generator is selected from a group consisting of: a negative ion generator, a positive ion generator, a positive and negative ion generator, a bipolar ion generator and a plasma generator.

4. The gas purification assembly according to claim 1, wherein the ion generator comprises one or more pairs of bipolar ion generators, the one or more pairs of bipolar ion generators comprising pairs of positive ion generators and negative ion generators.

5. The gas purification assembly according to claim 1, wherein the air-conditioning indoor unit further comprises a fan arranged near the ion generator.

6. The gas purification assembly according to claim 1, wherein the atomizing device is an ultrasonic atomizing device.

7. The gas purification assembly according to claim 1, wherein the cooling/heating unit is provided with a condensate water collection tray that maintains in fluid communication with the container of the atomizing device.

8. The gas purification assembly according to claim 1, wherein the cooling/heating unit is arranged between the atomizing device and the ion generator.

9. An air-conditioning indoor unit, wherein the air-conditioning indoor unit is configured with a gas purification assembly comprising:

a filter device arranged at or near an air inlet end of the air-conditioning indoor unit, for filtering particles entrained in gas entering through the air inlet end;

an ion generator located downstream of the filter device along the gas flow direction, for increasing content of positive and/or negative ions in the gas flow;

an atomizing device located downstream of the ion generator along the gas flow direction, for increasing humidity and amount of ions of the gas flow and eliminating ozone generated by the ion generator, wherein the atomizing device comprises a container in fluid communication with a cooling/heating unit configured to receive and accommodate a liquid to be atomized, the liquid being condensing water of the air-conditioning indoor unit; and a photocatalytic device located downstream of the atomizing device along the gas flow direction, for performing a photocatalytic reaction on humidified gas flow.

10. The gas purification assembly according to claim 9, wherein the photocatalytic device is an ultraviolet photocatalytic device comprising a titanium dioxide photocatalyst and an ultraviolet lamp.

11. The gas purification assembly according to claim 9, wherein the ion generator is selected from a group consisting of: a negative ion generator, a positive ion generator, a positive and negative ion generator, a bipolar ion generator and a plasma generator.

12. The gas purification assembly according to claim 9, wherein the ion generator comprises one or more pairs of bipolar ion generators, the one or more pairs of bipolar ion generators comprising pairs of positive ion generators and negative ion generators.

13. The gas purification assembly according to claim 9, wherein the air-conditioning indoor unit further comprises a fan arranged near the ion generator.

14. The gas purification assembly according to claim 9, wherein the atomizing device is an ultrasonic atomizing device.

15. The gas purification assembly according to claim 9, wherein the cooling/heating unit is provided with a condensate water collection tray that maintains in fluid communication with the container of the atomizing device.

16. The gas purification assembly according to claim 9, wherein the cooling/heating unit is arranged between the atomizing device and the ion generator.

* * * * *